(12) United States Patent
Shigeta et al.

(10) Patent No.: US 10,829,651 B2
(45) Date of Patent: Nov. 10, 2020

(54) AQUEOUS GRAVURE INK

(71) Applicants: THINK LABORATORY CO., LTD., Chiba (JP); KAO CORPORATION, Tokyo (JP)

(72) Inventors: Tatsuo Shigeta, Chiba (JP); Ryuma Mizushima, Wakayama (JP); Yuta Matsumoto, Wakayama (JP); Yasufumi Ueda, Wakayama (JP)

(73) Assignees: THINK LABORATORY CO., LTD., Chiba (JP); Kao Corporation, Tokyo (JP)

( * ) Notice: Subject to any disclaimer, the term of this patent is extended or adjusted under 35 U.S.C. 154(b) by 0 days.

(21) Appl. No.: 15/756,341

(22) PCT Filed: Aug. 3, 2016

(86) PCT No.: PCT/JP2016/072789
§ 371 (c)(1),
(2) Date: Feb. 28, 2018

(87) PCT Pub. No.: WO2017/047267
PCT Pub. Date: Mar. 23, 2017

(65) Prior Publication Data
US 2018/0244932 A1   Aug. 30, 2018

(30) Foreign Application Priority Data

Sep. 18, 2015   (JP) .................................. 2015-184941

(51) Int. Cl.
| | | |
|---|---|---|
| *C09D 11/03* | (2014.01) | |
| *C09D 11/033* | (2014.01) | |
| *C09D 11/023* | (2014.01) | |
| *C09D 11/037* | (2014.01) | |

(52) U.S. Cl.
CPC .......... *C09D 11/033* (2013.01); *C09D 11/023* (2013.01); *C09D 11/03* (2013.01); *C09D 11/037* (2013.01)

(58) Field of Classification Search
CPC ..... C09D 11/033; C09D 11/023; C09D 11/03; C09D 11/037; C09D 11/322; C09D 11/105
USPC ....................................................... 523/160
See application file for complete search history.

(56) References Cited

U.S. PATENT DOCUMENTS

| | | | |
|---|---|---|---|
| 3,694,238 A | 9/1972 | Tinghitella et al. | |
| 10,550,278 B2 * | 2/2020 | Il ......................... | C09D 11/322 |
| 2005/0124728 A1 | 6/2005 | Komatsu et al. | |
| 2012/0190789 A1 * | 7/2012 | Sekiyama .......... | C08G 18/0823 524/591 |
| 2013/0338319 A1 * | 12/2013 | Takenaka .................. | C09C 1/56 525/453 |
| 2015/0259553 A1 | 9/2015 | Nakagawa et al. | |
| 2015/0344713 A1 | 12/2015 | Mizushima et al. | |
| 2017/0158893 A1 * | 6/2017 | Fukui ......................... | B41J 2/01 |
| 2018/0215935 A1 * | 8/2018 | Il ................................ | B41J 2/01 |
| 2018/0244093 A1 * | 8/2018 | Shigeta .................... | B41M 1/10 |
| 2018/0311968 A1 * | 11/2018 | Sato .......................... | B41J 2/01 |
| 2019/0264043 A1 * | 8/2019 | Watanabe ............ | C09D 11/033 |

FOREIGN PATENT DOCUMENTS

| | | |
|---|---|---|
| CN | 101056954 A | 10/2007 |
| CN | 104870577 A | 8/2015 |
| EP | 0178555 A2 | 4/1986 |
| EP | 2 918 646 A1 | 9/2015 |
| EP | 3 275 949 A1 | 1/2018 |
| JP | 46-033536 A | 10/1971 |
| JP | S61-098777 A | 5/1986 |
| JP | H07-173425 A | 7/1995 |
| JP | H10-046089 A | 2/1998 |
| JP | 2002-188029 A | 7/2002 |
| JP | 2004-175934 A | 6/2004 |
| JP | 2005-097597 A | 4/2005 |
| JP | 2008-56786 A | 3/2008 |
| JP | 2011-046874 A | 3/2011 |
| JP | 2012-207130 A | 10/2012 |
| JP | 2013 142150 A | 7/2013 |
| KR | 10-2015-0097515 A | 8/2015 |
| RU | 2309852 C2 | 11/2007 |
| WO | 2015/093387 A1 | 6/2015 |

OTHER PUBLICATIONS

Machine Translation of JP 2011-046874 (Year: 2011).*

* cited by examiner

*Primary Examiner* — Hannah J Pak
(74) *Attorney, Agent, or Firm* — McGlew and Tuttle, P.C.

(57) ABSTRACT

Provided is an aqueous gravure ink that is environmentally friendly, allows high-resolution printing by virtue of its excellent highlight suitability, and is excellent in drying property. The aqueous gravure ink comprises: a pigment; a polymer; a water-soluble organic solvent; a surfactant; and water, in which the water-soluble organic solvent has a boiling point of 100° C. or more and 260° C. or less, in which a content of the water-soluble organic solvent in the aqueous gravure ink is 10 mass % or more and 35 mass % or less, and in which a content of the water in the aqueous gravure ink is 50 mass % or more and 70 mass % or less.

8 Claims, No Drawings

AQUEOUS GRAVURE INK

TECHNICAL FIELD

The present invention relates to an aqueous gravure ink.

BACKGROUND ART

Gravure printing is a printing method involving transferring ink onto a substrate through use of a gravure plate having formed therein cells for receiving ink. Quality of the printing can be controlled on the basis of depths of the cells and an interval between the cells (lines per inch).

In addition, the gravure printing allows printing with higher resolution than other printing systems, and hence has been put into practical use in security printing for prevention of forgery or the like. However, the gravure printing has required a special ink, for example, a pearl ink or a luminescent ink.

If high-resolution micro characters can be printed without use of any special ink, a demand from the market as an inexpensive security printing technology is high, and new ways of application, such as in-house information management and a secret marking on a product, are conceivable. In order to solve such problem, an aqueous gravure ink has been proposed.

A non-toluene-based ink has been used as the gravure ink to be used for the gravure printing with a view to improving a working environment. However, a VOC reduction and a $CO_2$ reduction have not been attained, and there has been desired an environmentally friendly aqueous ink.

For example, in Patent Document 1, there is a disclosure that satisfactory printing is performed on a highly nonpolar resin film through use of a water-soluble ink composition using N-methylpyrrolidone, a glycol ether, an esterified product of a glycol ether, and a terpene.

In Patent Document 2, there is a disclosure that a satisfactory drying property and printing suitability are both achieved through use of an aqueous gravure printing ink composition for a carton.

PRIOR ART DOCUMENTS

Patent Documents

Patent Document 1: JP 2002-188029 A
Patent Document 2: JP 2013-142150 A

SUMMARY OF THE INVENTION

Problems to be Solved by the Invention

However, the gravure ink described in Patent Document 1 uses a base ink with ethanol or isopropanol having a low boiling point as a diluent when printing is performed. Accordingly, the gravure ink cannot be said to be an environmentally friendly ink. In addition, the gravure ink assumes that the depth of each of the cells of a gravure plate is 20 μm, while the depth to be used in general printing is from 14 μm to 24 μm, and hence it is difficult to print a high-resolution image.

The technology described in Patent Document 2 similarly uses ethanol or isopropanol having a low boiling point as a diluent, and hence cannot be said to be an environmentally friendly ink. In addition, the technology assumes that the number of lines is 175 lines/inch, while a gravure plate number to be used in general printing is from 175 to 200 lines, and hence it is difficult to print a high-resolution image.

In view of the foregoing, an object of the present invention is to provide an aqueous gravure ink that is environmentally friendly, allows high-resolution printing by virtue of its excellent highlight suitability, and is excellent in drying property.

Means for Solving Problems

As a result of extensive investigations, the inventors of the present invention have found that the above-mentioned object can be achieved by using an aqueous gravure ink comprising: a pigment; a polymer; a water-soluble organic solvent; a surfactant; and water, in which the water-soluble organic solvent has a boiling point of 100° C. or more and 260° C. or less, in which a content of the water-soluble organic solvent in the aqueous gravure ink is 10 mass % or more and 35 mass % or less, and in which a content of the water in the aqueous gravure ink is 50 mass % or more and 70 mass % or less.

Specifically, it is considered that, when the aqueous gravure ink in which the content of the water-soluble organic solvent having a boiling point of 100° C. or more and 260° C. or less is 10 mass % or more and 35 mass % or less and the content of the water is 50 mass % or more and 70 mass % or less is used, the transfer ratio of the ink onto a printing substrate can be kept high without its drying in the cells of a gravure plate, resulting in satisfactory highlight suitability. It is considered that, when the content of the water-soluble organic solvent is less than 10 mass %, the drying in the cells proceeds to lower the transfer ratio of the ink, and hence the highlight suitability is poor. The highlight suitability refers to dot reproducibility of a portion having a low halftone dot ratio.

It is preferred that the water-soluble organic solvent in the aqueous gravure ink include one or more kinds selected from the group consisting of a glycol ether and a glycol.

It is suitable that the polymer in the aqueous gravure ink include water-insoluble polymers that include a polymer containing the pigment and a polymer free of the pigment.

It is preferred that the surfactant in the aqueous gravure ink include a nonionic surfactant.

Advantageous Effects of the Invention

According to the present invention, the following significant effect is exhibited: the aqueous gravure ink that is environmentally friendly, allows high-resolution printing by virtue of its excellent highlight suitability, and is excellent in drying property can be provided.

MODES FOR CARRYING OUT THE INVENTION

[Aqueous Gravure Ink]

An aqueous gravure ink to be used in the present invention includes a pigment, a polymer, a water-soluble organic solvent, a surfactant, and water. The content of each component in the gravure ink to be described below refers to its content at the time of printing. As an aqueous gravure ink according to an embodiment of the present invention, the form of an ink having the contents at the time of printing, or the form of being used by adjusting a base ink to the contents at the time of printing through dilution with water or the like may be adopted.

[Pigment]

The kind of the pigment to be used in the ink of the present invention may be any of an inorganic pigment and an organic pigment.

Examples of the inorganic pigment include carbon black and a metal oxide. Carbon black is preferred as an inorganic pigment for a black ink. Examples of the carbon black include furnace black, thermal lamp black, acetylene black, and channel black. As an inorganic pigment for a white ink, there are given, for example, metal oxides, such as titanium dioxide, zinc oxide, silica, alumina, and magnesium oxide.

Examples of the organic pigment include an azo pigment, a diazo pigment, a phthalocyanine pigment, a quinacridone pigment, an isoindolinone pigment, a dioxazine pigment, a perylene pigment, a perinone pigment, a thioindigo pigment, an anthraquinone pigment, and a quinophthalone pigment.

The hue is not particularly limited, and any of chromatic pigments, such as yellow, magenta, cyan, red, blue, orange, and green, may be used.

The form of the pigment to be used in the present invention is one or more kinds of pigments selected from a self-dispersible pigment and particles in which a pigment is dispersed with a polymer.

[Self-Dispersible Pigment]

The self-dispersible pigment that may be used in the present invention means a pigment capable of being dispersed in an aqueous medium without use of a surfactant or a resin, by bonding one or more kinds of hydrophilic functional groups (an anionic hydrophilic group, such as a carboxy group or a sulfonic acid group, or a cationic hydrophilic group, such as a quaternary ammonium group) to the surface of the pigment directly or via another atomic group, such as an alkanediyl group having 1 to 12 carbon atoms. In order to render the pigment into the self-dispersible pigment, for example, a required amount of the hydrophilic functional group may be chemically bonded to the surface of the pigment by a conventional method. As commercially available products of the self-dispersible pigment, there are given, for example: CAB-O-JET 200, CAB-O-JET 300, CAB-O-JET 352K, CAB-O-JET 250A, CAB-O-JET 260M, CAB-O-JET 270Y, CAB-O-JET 450A, CAB-O-JET 465M, CAB-O-JET 470Y, and CAB-O-JET 480V manufactured by Cabot Japan K.K.; BONJET CW-1 and BONJET CW-2 manufactured by Orient Chemical Industries Co., Ltd.; Aqua-Black 162 manufactured by Tokai Carbon Co., Ltd.; and SENSIJET Black SDP100, SDP1000, and SDP2000 manufactured by Sensient Industrial Colors. The self-dispersible pigment is preferably used as a pigment aqueous dispersion dispersed in water.

From the viewpoint of printing density, the content of the pigment in the ink is preferably 1 mass % or more and 20 mass % or less, more preferably 2 mass % or more and 18 mass % or less, still more preferably 3 mass % or more and 15 mass % or less.

[Polymer]

As the polymer to be used in the present invention, any of a water-soluble polymer and a water-insoluble polymer may be preferably used.

From the viewpoint of dispersing the pigment and the viewpoint of fixability, the content of the polymer in the ink is preferably 3 mass % or more and 38 mass % or less, more preferably 5 mass % or more and 30 mass % or less, still more preferably 5 mass % or more and 25 mass % or less.

[Water-Soluble Polymer]

The water-soluble polymer refers to such a polymer that, when the polymer is dried at 105° C. for 2 hours to reach a constant mass and is then dissolved in 100 g of water at 25° C., its dissolution amount is 10 g or more. In the case of an anionic polymer, the dissolution amount is a dissolution amount when the anionic groups of the polymer are 100% neutralized with sodium hydroxide.

The water-soluble polymer to be used in the present invention may be used for the purpose of dispersing the pigment in the water-based ink.

Examples of the polymer to be used include polyester, polyurethane, and a vinyl-based polymer. Of those, from the viewpoint of the dispersion stability of the pigment, a vinyl-based polymer obtained by addition polymerization of a vinyl monomer (a vinyl compound, a vinylidene compound, or a vinylene compound) is preferred.

Examples of the vinyl-based polymer include acrylic resins and styrene-acrylic resins, such as "Joncryl 690", "Joncryl 60", "Joncryl 6610", and "HPD-71" (all of which are manufactured by BASF Japan Ltd.).

[Water-Insoluble Polymer]

The water-insoluble polymer refers to such a polymer that, when the polymer is dried at 105° C. for 2 hours to reach a constant mass and is then dissolved in 100 g of water at 25° C., its dissolution amount is less than 10 g. The dissolution amount is preferably less than 5 g, more preferably less than 1 g. In the case of an anionic polymer, the dissolution amount is a dissolution amount when the anionic groups of the polymer are 100% neutralized with sodium hydroxide.

The water-insoluble polymer may be used by being dispersed in the gravure ink as polymer particles each containing the pigment and polymer particles free of the pigment. The water-insoluble polymer containing the pigment is hereinafter sometimes referred to as "water-insoluble polymer a", and the water-insoluble polymer free of the pigment is hereinafter sometimes referred to as "water-insoluble polymer b".

[Water-Insoluble Polymer a]

Examples of the water-insoluble polymer a serving as the polymer containing the pigment include polyester, polyurethane, and a vinyl-based polymer. Of those, from the viewpoint of improving the storage stability of the water-based ink, a vinyl-based polymer obtained by addition polymerization of a vinyl monomer (a vinyl compound, a vinylidene compound, or a vinylene compound) is preferred.

The vinyl-based polymer is preferably a vinyl-based polymer obtained by copolymerizing a monomer mixture containing an ionic monomer (a-1) (hereinafter sometimes referred to as "component (a-1)") and a hydrophobic monomer (a-2) (hereinafter sometimes referred to as "component (a-2)") (hereinafter sometimes referred to simply as "monomer mixture"). This vinyl-based polymer has a constituent unit derived from the component (a-1) and a constituent unit derived from the component (a-2).

[Ionic Monomer (a-1)]

The ionic monomer (a-1) is preferably used as a monomer component of the water-insoluble polymer from the viewpoint of improving the dispersion stability of the pigment-containing polymer particles in the ink. Examples of the ionic monomer include an anionic monomer and a cationic monomer. Of those, an anionic monomer is preferred.

Examples of the anionic monomer include a carboxylic acid monomer, a sulfonic acid monomer, and a phosphoric acid monomer.

Examples of the carboxylic acid monomer include acrylic acid, methacrylic acid, crotonic acid, itaconic acid, maleic acid, fumaric acid, citraconic acid, and 2-methacryloyloxymethylsuccinic acid.

Of the above-mentioned anionic monomers, from the viewpoint of improving the dispersion stability of the pigment-containing polymer particles in the ink, carboxylic acid monomers are preferred, and acrylic acid and methacrylic acid are more preferred.

[Hydrophobic Monomer (a-2)]

The hydrophobic monomer (a-2) is preferably used as a monomer component of the water-insoluble polymer from the viewpoint of improving the dispersion stability of the pigment-containing polymer particles in the ink. Examples of the hydrophobic monomer include an alkyl (meth)acrylate, an aromatic group-containing monomer, and a macromonomer.

The alkyl (meth)acrylate is preferably an alkyl (meth) acrylate having an alkyl group having 1 to 22 carbon atoms, preferably 6 to 18 carbon atoms, and examples thereof include methyl (meth)acrylate, ethyl (meth)acrylate, (iso) propyl (meth)acrylate, (iso or tertiary)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate.

"(Iso or tertiary)" and "(iso)" mean both of a case in which those groups are present and a case in which those groups are not present, and represent normal in the case where those groups are not present. In addition, "(meth) acrylate" represents acrylate and/or methacrylate.

The aromatic group-containing monomer is preferably a vinyl monomer having an aromatic group having 6 to 22 carbon atoms that may have a substituent containing a heteroatom, more preferably a styrene-based monomer or an aromatic group-containing (meth)acrylate.

The styrene-based monomer is preferably styrene, 2-methylstyrene, or divinylbenzene, more preferably styrene.

In addition, the aromatic group-containing (meth)acrylate is preferably benzyl (meth)acrylate, phenoxyethyl (meth) acrylate, or the like, more preferably benzyl (meth)acrylate.

The macromonomer is a compound having a polymerizable functional group at one terminal thereof and having a number-average molecular weight of 500 or more and 100,000 or less, and is preferably used as a monomer component of the water-insoluble polymer from the viewpoint of improving the dispersion stability of the pigment-containing polymer particles in the ink. The polymerizable functional group present at one terminal is preferably an acryloyloxy group or a methacryloyloxy group, more preferably a methacryloyloxy group.

The number-average molecular weight of the macromonomer is preferably 1,000 or more and 10,000 or less. The number-average molecular weight is measured by a gel permeation chromatography method using, as a solvent, chloroform containing 1 mmol/L dodecyldimethylamine with the use of polystyrene as a reference material.

From the viewpoint of improving the dispersion stability of the pigment-containing polymer particles in the ink, the macromonomer is preferably an aromatic group-containing monomer-based macromonomer or a silicone-based macromonomer, more preferably an aromatic group-containing monomer-based macromonomer.

As an aromatic group-containing monomer constituting the aromatic group-containing monomer-based macromonomer, the above-mentioned aromatic group-containing monomers are given. Of those, styrene and benzyl (meth)acrylate are preferred, and styrene is more preferred.

Specific examples of the styrene-based macromonomer include AS-6(S), AN-6(S), and HS-6(S) manufactured by Toagosei Co., Ltd.

An example of the silicone-based macromonomer is an organopolysiloxane having a polymerizable functional group at one terminal thereof.

For the hydrophobic monomer (a-2), two or more kinds of the above-mentioned monomers may be used. The styrene-based monomer, the aromatic group-containing (meth)acrylate, and the macromonomer may be used in combination, and in particular, the macromonomer is preferably used in combination with another hydrophobic monomer.

[Nonionic Monomer (a-3)]

For the water-insoluble polymer, from the viewpoint of improving the dispersion stability of the pigment-containing polymer particles in the ink, it is preferred to further use a nonionic monomer (a-3) (hereinafter sometimes referred to as "component (a-3)") as a monomer component. The nonionic monomer is a monomer having high affinities for water and a water-soluble organic solvent, and is, for example, a monomer containing a hydroxy group or a polyalkylene glycol.

Examples of the component (a-3) include 2-hydroxyethyl (meth)acrylate, 3-hydroxypropyl (meth)acrylate, polyalkylene glycol (meth)acrylates, such as polypropylene glycol (n=2 to 30, n represents an average number of moles of an oxyalkylene group added. The same applies hereinafter.) (meth)acrylate and polyethylene glycol (meth)acrylate (n=2 to 30), alkoxy polyalkylene glycol (meth)acrylates, such as methoxypolyethylene glycol (n=1 to 30) (meth)acrylate, and phenoxy (ethylene glycol-propylene glycol copolymer) (n=1 to 30, ethylene glycol therein: n=1 to 29) (meth)acrylate.

Specific examples of the component (a-3) that is commercially available include: NK Ester TM-20G, TM-40G, TM-90G, and TM-230G manufactured by Shin-Nakamura Chemical Co., Ltd.; and BLEMMER PE-90, PE-200, PE-350, PME-100, PME-200, PME-400, PP-500, PP-800, PP-1000, AP-150, AP-400, AP-550, 50PEP-300, 50POEP-800B, and 43PAPE-600B manufactured by NOF Corporation.

The above-mentioned components (a-1) to (a-3) may be used alone or as a mixture thereof.

(Content of each Component or Constituent Unit in Monomer Mixture or in Polymer)

The contents of the components (a-1) to (a-3) in the monomer mixture at the time of the production of the vinyl-based polymer (contents in terms of unneutralized amounts. The same applies hereinafter.) or the contents of constituent units derived from the components (a-1) to (a-3) in the water-insoluble polymer are as described below from the viewpoint of improving the dispersion stability of the pigment-containing polymer particles in the ink.

The content of the component (a-1) is preferably 3 mass % or more and 40 mass % or less, more preferably 5 mass % or more and 30 mass % or less, still more preferably 7 mass % or more and 20 mass % or less.

The content of the component (a-2) is preferably 5 mass % or more and 86 mass % or less, more preferably 10 mass % or more and 80 mass % or less, still more preferably 20 mass % or more and 60 mass % or less.

The content of the component (a-3) is preferably 5 mass % or more and 60 mass % or less, more preferably 10 mass % or more and 55 mass % or less, still more preferably 15 mass % or more and 40 mass % or less.

In addition, the mass ratio "[component (a-1)/component (a-2)]" is preferably from 0.01 to 1, more preferably from 0.05 to 0.60, still more preferably from 0.10 to 0.30.

The ionic monomer (a-1) is a dispersing group using electric charge repulsion in the ink, and the nonionic monomer (a-3) is a dispersing group using steric repulsion in the ink. The addition of the nonionic monomer (a-3) to the hydrophobic monomer (a-2) and the ionic monomer (a-1) further enhances the stability of the pigment-containing polymer particles in the ink, resulting in higher ink stability.

In addition, when an ink dries, water volatilizes first in many cases. When, in dispersion media (water and a water-soluble organic solvent), the water (dispersion medium that has a high dielectric constant and enhances the electric charge repulsion of a dispersion most among the dispersion media) is decreased, the electric charge repulsion property of the dispersion is remarkably lowered to lower ink stability, resulting in degradation in ejection property. In this connection, when the nonionic monomer is also used (the steric repulsion group is introduced) in addition to the ionic monomer, a state in which the stability of the pigment-containing polymer particles is high can be kept by the nonionic group (steric repulsion group) even under conditions under which the water volatilizes to lower the dielectric constant of the dispersion media and hence the electric charge repulsion group hardly functions.

(Production of Water-Insoluble Polymer a)

The water-insoluble polymer a is produced by copolymerizing a monomer mixture by a known polymerization method. The polymerization method is preferably a solution polymerization method.

A solvent to be used in the solution polymerization method is not limited, but is preferably a polar organic solvent, such as an aliphatic alcohol having 1 to 3 carbon atoms, a ketone, an ether, or an ester. Specific examples thereof include methanol, ethanol, acetone, and methyl ethyl ketone. Of those, methyl ethyl ketone is preferred from the viewpoint of the dissolution property of the solvent for the water-insoluble polymer.

In the polymerization, a polymerization initiator and a polymerization chain transfer agent may be used. The polymerization initiator is preferably an azo compound, more preferably 2,2'-azobis(2,4-dimethylvaleronitrile). The polymerization chain transfer agent is preferably a mercaptan, more preferably 2-mercaptoethanol.

Preferred polymerization conditions vary depending on, for example, the kind of the polymerization initiator, but from the viewpoint of the reactivity of the polymerization initiator, a polymerization temperature is preferably 50° C. or more and 90° C. or less, and a polymerization time is preferably 1 hour or more and 20 hours or less. In addition, a polymerization atmosphere is preferably a nitrogen gas atmosphere or an inert gas atmosphere such as argon.

After the completion of the polymerization reaction, the generated polymer may be isolated from the reaction solution by a known method, for example, reprecipitation or solvent evaporation. In addition, an unreacted monomer and the like may be removed from the obtained polymer by reprecipitation, membrane separation, chromatography, an extraction method, or the like.

From the viewpoint of improving the productivity of an aqueous dispersion of the pigment-containing polymer particles, the water-insoluble polymer a is preferably used while keeping the form of a polymer solution without the removal of the solvent used in the polymerization reaction, in order to use the contained organic solvent as an organic solvent to be used in a step I to be described later.

From the viewpoint of improving the productivity of the aqueous dispersion of the pigment-containing polymer particles, the solid content concentration of the water-insoluble polymer a solution is preferably 30 mass % or more, more preferably 40 mass % or more, and is preferably 60 mass % or less, more preferably 50 mass % or less.

From the viewpoint of improving the dispersion stability of the pigment-containing polymer particles in the ink and the viewpoint of improving the fixing strength of the ink to a recording medium, the weight-average molecular weight of the water-insoluble polymer a to be used in the present invention is preferably 20,000 or more and 500,000 or less, more preferably 30,000 or more and 300,000 or less, still more preferably 50,000 or more and 200,000 or less.

From the viewpoints of the dispersibility of the pigment and the adsorbability of the polymer, the acid value of the water-insoluble polymer a to be used in the present invention is preferably 50 or more and 140 or less, more preferably 60 or more and 130 or less, still more preferably 70 or more and 120 or less.

The weight-average molecular weight and the acid value may be measured by methods to be described later in Examples.

[Polymer Particles Each Containing Pigment (Pigment-Containing Polymer Particles)]

The pigment-containing polymer particles are particles each having the water-insoluble polymer adhering to the surface of the pigment, and the water-insoluble polymer allows the pigment to be stably dispersed in water and the ink.

(Production of Pigment-Containing Polymer Particles)

The pigment-containing polymer particles can be efficiently produced as an aqueous dispersion by a method including the following step I and step II.

In the production of the pigment-containing polymer particles by the production method including the steps I and II, the pigment and the polymer a are not chemically bonded to each other, but are in an irreversibly adsorbed state. In the ink, the pigment and the polymer are always adsorbed to each other, i.e., present as polymer particles each containing the pigment. Meanwhile, "water-insoluble polymer particles" may be used as an ink component as described later, but have the following difference: whereas the pigment-containing polymer particles are polymer particles each containing the pigment (the pigment and the polymer are irreversibly adsorbed to each other), the water-insoluble polymer particles are polymer particles free of the pigment.

Step I: a step of subjecting a mixture containing the water-insoluble polymer a, an organic solvent, a pigment, and water (hereinafter sometimes referred to as "pigment mixture") to dispersion treatment, to thereby obtain a dispersion of pigment-containing polymer particles Step II: a step of removing the organic solvent from the dispersion obtained in the step I, to thereby obtain an aqueous dispersion of the pigment-containing polymer particles (hereinafter sometimes referred to as "pigment aqueous dispersion")

In addition, a step III, which is an optional step, may be further performed.

Step III: a step of performing cross-linking treatment by mixing the aqueous dispersion obtained in the step II and a cross-linking agent, to thereby obtain an aqueous dispersion (Step I)

In the step I, a method involving first dissolving the water-insoluble polymer a in the organic solvent, and then adding and mixing the pigment, water, and as necessary, a neutralizer, a surfactant, and the like into the resultant organic solvent solution to obtain an oil-in-water dispersion is preferred. The order of addition into the organic solvent solution of the water-insoluble polymer is not limited, but it is preferred that the water, the neutralizer, and the pigment be added in the stated order.

The organic solvent for dissolving the water-insoluble polymer a is not limited, but from the viewpoint of the ease of organic solvent removal in the step II, is preferably an aliphatic alcohol having 1 to 3 carbon atoms, a ketone, an ether, an ester, or the like, more preferably a ketone, still more preferably methyl ethyl ketone. When the water-insoluble polymer is synthesized by the solution polymerization method, the solvent used in the polymerization may be used as it is. Organic solvent-removing treatment is performed in the step II, and hence the above-mentioned organic solvent is not incorporated into final pigment-containing polymer particles.

When the water-insoluble polymer a is an anionic polymer, anionic groups in the water-insoluble polymer may be neutralized using a neutralizer. When the neutralizer is used, neutralization is preferably performed so as to achieve a pH of 7 or more and 11 or less. Examples of the neutralizer include bases, such as lithium hydroxide, sodium hydroxide, potassium hydroxide, ammonia, and various amines. In addition, the water-insoluble polymer may be neutralized in advance.

From the viewpoint of improving the dispersion stability of the pigment-containing polymer particles in each of the ink and the pigment aqueous dispersion, the degree of neutralization of the anionic groups of the water-insoluble polymer a is preferably 0.3 mol or more and 3.0 mol or less, more preferably 0.4 mol or more and 2.0 mol or less, still more preferably 0.5 mol or more and 1.5 mol or less, with respect to 1 mol of the anionic groups.

Herein, the degree of neutralization is the quotient of the molar equivalent of the neutralizer by the molar quantity of the anionic groups of the water-insoluble polymer.

(Content of each Component in Pigment Mixture)

From the viewpoint of improving the dispersion stability of the pigment-containing polymer particles in the ink for gravure printing and in the pigment aqueous dispersion and the viewpoint of improving the productivity of the pigment aqueous dispersion, the content of the pigment in the pigment mixture is preferably 10 mass % or more and 30 mass % or less, more preferably 12 mass % or more and 27 mass % or less, still more preferably 14 mass % or more and 25 mass % or less.

From the viewpoint of improving the dispersion stability of the pigment aqueous dispersion and the storage stability of the ink for gravure printing, the content of the water-insoluble polymer a in the pigment mixture is preferably 2.0 mass % or more and 15 mass % or less, more preferably 4.0 mass % or more and 12 mass % or less, still more preferably 5.0 mass % or more and 10 mass % or less.

From the viewpoint of improving wettability to the pigment and the adsorbability of the water-insoluble polymer to the pigment, the content of the organic solvent in the pigment mixture is preferably 10 mass % or more and 35 mass % or less, more preferably 12 mass % or more and 30 mass % or less, still more preferably 15 mass % or more and 25 mass % or less.

From the viewpoint of improving the dispersion stability of the pigment aqueous dispersion and the viewpoint of improving the productivity of the pigment aqueous dispersion, the content of the water in the pigment mixture is preferably 40 mass % or more and 75 mass % or less, more preferably 45 mass % or more and 70 mass % or less, still more preferably 50 mass % or more and 65 mass % or less.

From the viewpoint of improving the dispersion stability of the pigment aqueous dispersion and the storage stability of the ink for gravure printing, the mass ratio "[pigment/water-insoluble polymer]" of the pigment to the water-insoluble polymer a is preferably from 30/70 to 90/10, more preferably from 40/60 to 85/15, still more preferably from 50/50 to 75/25.

In the step I, further, the pigment mixture is dispersed to obtain a dispersion treatment product. A dispersion method for obtaining the dispersion treatment product is not particularly limited. The pigment particles may be atomized until their average particle diameter becomes a desired particle diameter by only main dispersion, but it is preferred that the pigment mixture be subjected to preliminary dispersion, and then be further subjected to the main dispersion by applying a shear stress so as to control the average particle diameter of the pigment particles to the desired particle diameter.

A temperature in the preliminary dispersion of the step I is preferably 0° C. or more, and is preferably 40° C. or less, more preferably 30° C. or less, still more preferably 20° C. or less, and a dispersion time is preferably 0.5 hour or more and 30 hours or less, more preferably 1 hour or more and 20 hours or less, still more preferably 1 hour or more and 10 hours or less.

In the preliminary dispersion of the pigment mixture, a generally used mixing and stirring apparatus, such as an anchor blade or a disper blade, may be used. Of those, a high-speed stirring and mixing apparatus is preferred.

As means for applying a shear stress in the main dispersion, there are given, for example: kneading machines, such as a roll mill and a kneader; high-pressure homogenizers, such as Microfluidizer (manufactured by Microfluidics Corp.); and medium-type dispersing machines, such as a paint shaker and a bead mill. Commercially available examples of the medium-type dispersing machines include Ultra Apex Mill (manufactured by Kotobuki Industries Co., Ltd.) and PICO MILL (manufactured by Asada Iron Works Co., Ltd.). Those apparatus may be used in combination thereof. Of those, from the viewpoint of reducing the particle diameter of the pigment, a high-pressure homogenizer is preferably used.

When the main dispersion is performed using the high-pressure homogenizer, the pigment may be controlled so as to have a desired particle diameter through the control of a treatment pressure and the number of passes.

From the viewpoints of productivity and economic efficiency, the treatment pressure is preferably 60 MPa or more and 200 MPa or less, more preferably 100 MPa or more and 180 MPa or less, still more preferably 130 MPa or more and 180 MPa or less.

In addition, the number of passes is preferably 3 or more and 30 or less, more preferably 5 or more and 25 or less.

(Step II)

In the step II, the organic solvent is removed from the obtained dispersion by a known method, and thus an aqueous dispersion of the pigment-containing polymer particles can be obtained. It is preferred that the organic solvent in the obtained aqueous dispersion containing the pigment-containing polymer particles be substantially removed, but the organic solvent may remain as long as the object of the present invention is not impaired. The amount of the residual organic solvent is preferably 0.1 mass % or less, more preferably 0.01 mass % or less.

In addition, as necessary, the dispersion may be subjected to heating and stirring treatment before the evaporation of the organic solvent.

The obtained aqueous dispersion of the pigment-containing polymer particles is such that solid water-insoluble polymer particles each containing the pigment are dispersed in media in which water serves as a main medium. In this case, the form of the water-insoluble polymer particles is not particularly limited, and it is only necessary that the particles be each formed of at least the pigment and the water-insoluble polymer. Examples thereof include: a particle form in which the pigment is encapsulated in the water-insoluble polymer; a particle form in which the pigment is uniformly dispersed in the water-insoluble polymer; a particle form in which the pigment is exposed on the surface of each of the water-insoluble polymer particles; and a mixture thereof.

(Step III)

The step III, which is an optional step, is a step of performing cross-linking treatment by mixing the aqueous dispersion obtained in the step II and a cross-linking agent, to thereby obtain an aqueous dispersion.

In this case, when the water-insoluble polymer is an anionic water-insoluble polymer having an anionic group, the cross-linking agent is preferably a compound having a functional group capable of reacting with the anionic group, more preferably a compound having 2 or more, preferably 2 to 6 of the functional groups in the molecule.

Suitable examples of the cross-linking agent include a compound having 2 or more epoxy groups in the molecule, a compound having 2 or more oxazoline groups in the molecule, and a compound having 2 or more isocyanate groups in the molecule. Of those, a compound having 2 or more epoxy groups in the molecule is preferred, and trimethylolpropane polyglycidyl ether is more preferred.

From the viewpoint of improving the dispersion stability of the pigment aqueous dispersion and the viewpoint of facilitating the preparation of the ink for gravure printing, the non-volatile component concentration (solid content concentration) of the obtained pigment aqueous dispersion is preferably 10 mass % or more and 30 mass % or less, more preferably 15 mass % or more and 25 mass % or less.

From the viewpoint of reducing coarse particles, the average particle diameter of the pigment-containing polymer particles in the pigment aqueous dispersion is preferably 30 nm or more and 200 nm or less, more preferably 40 nm or more and 180 nm or less, still more preferably 50 nm or more and 170 nm or less.

The average particle diameter of the pigment-containing polymer particles is measured by a method to be described later in Examples.

In addition, the average particle diameter of the pigment-containing polymer particles in the gravure ink is the same as the average particle diameter in the pigment aqueous dispersion, and a preferred mode of the average particle diameter is the same as the preferred mode of the average particle diameter in the pigment aqueous dispersion.

(Content of each Component of Pigment-Containing Polymer Particles in Gravure Ink)

From the viewpoint of printing density, the content of the pigment in the ink is preferably 1 mass % or more and 20 mass % or less, more preferably 2 mass % or more and 18 mass % or less, still more preferably 3 mass % or more and 15 mass % or less. From the viewpoints of printing density and fixability, the content of the pigment-containing polymer particles in the ink is preferably 1 mass % or more and 30 mass % or less, more preferably 3 mass % or more and 25 mass % or less, still more preferably 5 mass % or more and 20 mass % or less.

From the viewpoint of fixability, the content of the water-insoluble polymer in the pigment-containing polymer particles in the ink is preferably 1 mass % or more and 20 mass % or less, more preferably 2 mass % or more and 15 mass % or less, still more preferably 3 mass % or more and 10 mass % or less.

[Water-Insoluble Polymer b]

The water-insoluble polymer b is formed of polymer particles free of the pigment. As a component thereof, there are given, for example, an acrylic resin, a styrene-based resin, a urethane-based resin, a polyester-based resin, a styrene-acrylic resin, a butadiene-based resin, a styrene-butadiene-based resin, a vinyl chloride-based resin, a vinyl acetate-based resin, and an acrylic silicone-based resin. Of those, an acrylic resin is preferred from the viewpoint of accelerating a drying property on a printing substrate to improve the rub fastness of a printed product.

In addition, from the viewpoint of improving the productivity of the water-based ink, the water-insoluble polymer b is preferably used as a dispersion liquid containing water-insoluble polymer particles. As the water-insoluble polymer particles, appropriately synthesized ones may be used, or a commercially available product may be used.

The water-insoluble polymer b is produced by copolymerizing a mixture of monomers by a known polymerization method. Preferred examples of the polymerization method include an emulsion polymerization method and a suspension polymerization method. Of those, an emulsion polymerization method is more preferred.

A polymerization initiator may be used in the polymerization. Examples of the polymerization initiator include a persulfate and a water-soluble azo polymerization initiator. Of those, a persulfate, such as ammonium persulfate or potassium persulfate, is preferred.

A surfactant may be used in the polymerization. Examples of the surfactant include a nonionic surfactant, an anionic surfactant, and a cationic surfactant. Of those, a nonionic surfactant is preferred from the viewpoint of improving the dispersion stability of the resin particles. Examples of the nonionic surfactant include a polyoxyethylene alkyl ether, a polyoxyethylene alkyl aryl ether, a polyoxyethylene fatty acid ester, and an oxyethylene/oxypropylene block copolymer. Of those, a polyoxyethylene alkyl ether is preferred from the viewpoint of improving the dispersion stability of the resin particles.

Preferred polymerization conditions vary depending on, for example, the kind of the polymerization initiator, but a polymerization temperature is preferably 50° C. or more and 90° C. or less, and a polymerization time is preferably 1 hour or more and 20 hours or less. In addition, a polymerization atmosphere is preferably a nitrogen gas atmosphere or an inert gas atmosphere such as argon.

After the completion of the polymerization reaction, the generated polymer may be isolated from the reaction solution by a known method, for example, reprecipitation or solvent evaporation. In addition, an unreacted monomer and the like may be removed from the obtained polymer by reprecipitation, membrane separation, chromatography, an extraction method, or the like.

From the viewpoint of compatibility in the ink, the water-insoluble polymer b is preferably used as a polymer dispersion using water as a dispersion medium without the removal of the solvent used in the polymerization reaction.

Commercially available examples of the dispersion of the water-insoluble polymer b include: acrylic resins, such as "Neocryl A1127" (manufactured by DSM NeoResins, Inc., anionic self-cross-linking water-based acrylic resin) and "Joncryl 390" (manufactured by BASF Japan Ltd.); urethane resins, such as "WBR-2018" and "WBR-2000U"

(manufactured by Taisei Fine Chemical Co., Ltd.); styrene-butadiene resins, such as "SR-100" and "SR102" (both of which are manufactured by Nippon A & L Inc.); styrene-acrylic resins, such as "Joncryl 7100", "Joncryl 734", and "Joncryl 538" (all of which are manufactured by BASF Japan Ltd.); and vinyl chloride-based resins, such as "Vinyblan 701" (manufactured by Nissin Chemical Industry Co., Ltd.).

As a form of the water-insoluble polymer b, there are given particles dispersed in water. The dispersion of the water-insoluble polymer particles forms a film on a printing substrate to improve fixability.

From the viewpoint of the fixability of the ink, the content of the water-insoluble polymer b in the ink is preferably 1 mass % or more and 30 mass % or less, more preferably 2 mass % or more and 20 mass % or less, still more preferably 3 mass % or more and 15 mass % or less. When the content is less than the lower limit of the above-mentioned range, the fixability of the ink is lowered, and when the content is more than the upper limit, the storage stability of the ink may be lowered.

From the viewpoint of the fixability, the weight-average molecular weight of the water-insoluble polymer b to be used in the present invention is preferably 100,000 or more, more preferably 200,000 or more, still more preferably 500,000 or more, and is preferably 2,500,000 or less, more preferably 1,000,000 or less.

In addition, from the viewpoint of the storage stability of the ink, the average particle diameter of the water-insoluble polymer particles in the dispersion or ink containing the water-insoluble polymer particles is preferably 10 nm or more, more preferably 30 nm or more, still more preferably 50 nm or more, and is preferably 300 nm or less, more preferably 200 nm or less, still more preferably 150 nm or less, even still more preferably 130 nm or less.

From the viewpoint of the storage stability of the ink, the acid value of the water-insoluble polymer b to be used in the present invention is preferably 1 or more and 45 or less, more preferably 3 or more and 40 or less, still more preferably 5 or more and 35 or less.

The weight-average molecular weight and the average particle diameter of the water-insoluble polymer b are measured by methods described in Examples.

From the viewpoint of the stability of the ink, the ratio between the pigment and the water-insoluble polymers (total amount of the polymer a and the polymer b) in the ink of the present invention is preferably from 100/20 to 100/300, more preferably from 100/30 to 100/280, still more preferably from 100/50 to 100/250.

[Water-Soluble Organic Solvent]

The water-soluble organic solvent to be used in the present invention may be freely used irrespective of whether the water-soluble organic solvent is a liquid or a solid at normal temperature. The water-soluble organic solvent refers to such an organic solvent that, when the organic solvent is dissolved in 100 ml of water at 25° C., its dissolution amount is 10 ml or more.

In the present invention, the content of the water-soluble organic solvent having a boiling point of 100° C. or more and 260° C. or less in the aqueous gravure ink is 10 mass % or more and 35 mass % or less. From the viewpoint of improving the highlight suitability and the drying property, the content of the water-soluble organic solvent having a boiling point of 100° C. or more and 260° C. or less in the ink is preferably 11 mass % or more, more preferably 13 mass % or more, and is preferably 32 mass % or less, more preferably 30 mass % or less.

From the viewpoint of improving the highlight suitability and the drying property, the boiling point of the water-soluble organic solvent in the ink is preferably 110° C. or more, more preferably 120° C. or more, still more preferably 140° C. or more, even still more preferably 160° C. or more, and is preferably 250° C. or less, more preferably 240° C. or less, still more preferably 235° C. or less, even still more preferably 220° C. or less. Herein, the boiling point refers to a standard boiling point (boiling point under 1 atmosphere).

Examples of the water-soluble organic solvent include a glycol ether, an alcohol, a polyhydric alcohol having two or more hydroxy groups, pyrrolidone, and an alkanolamine. From the viewpoint of improving the highlight suitability and the drying property, the water-soluble organic solvent preferably contains one or more kinds selected from a glycol ether and a glycol, and more preferably contains a glycol ether.

From the viewpoint of improving the highlight suitability and the drying property, the molecular weight of the glycol ether is preferably 70 or more and 200 or less, more preferably 80 or more and 190 or less, still more preferably 100 or more and 180 or less.

Examples of the glycol ether include ethylene glycol monomethyl ether (125° C.), ethylene glycol monoisopropyl ether (142° C.), ethylene glycol monobutyl ether (171° C.), ethylene glycol monoisobutyl ether (161° C.), diethylene glycol monomethyl ether (194° C.), diethylene glycol monoisopropyl ether (207° C.), diethylene glycol monobutyl ether (231° C.), diethylene glycol monoisobutyl ether (220° C.), propylene glycol monomethyl ether (121° C.), propylene glycol monopropyl ether (150° C.), dipropylene glycol monomethyl ether (187° C.), tripropylene glycol monomethyl ether (220° C.), diethylene glycol dimethyl ether (162° C.), diethylene glycol methyl ethyl ether (176° C.), diethylene glycol diethyl ether (189° C.), and triethylene glycol dimethyl ether (216° C.). Numerical values in the parentheses represent boiling points. Those glycol ethers may be used in combination thereof. Of those, diethylene glycol monomethyl ether, diethylene glycol monoisopropyl ether, diethylene glycol monobutyl ether, diethylene glycol monoisobutyl ether, dipropylene glycol monomethyl ether, tripropylene glycol monomethyl ether, diethylene glycol dimethyl ether, diethylene glycol methyl ethyl ether, and diethylene glycol diethyl ether are preferred from the viewpoints of the drying property and highlight suitability of the ink.

Examples of the glycol include propylene glycol (188° C.), 1,2-butanediol (194° C.), ethylene glycol (197° C.), 3-methyl-1,3-butanediol (203° C.), 1,2-pentanediol (210° C.), 2-methyl-1,3-propanediol (214° C.), 1,2-hexanediol (224° C.), 1,3-propanediol (230° C.), dipropylene glycol (231° C.), and diethylene glycol (244° C.). Numerical values in parentheses represent boiling points. Those glycols may be used in combination thereof. The glycol preferably contains propylene glycol from the viewpoints of the drying property and highlight suitability of the ink.

The aqueous gravure ink of the present invention may contain a water-soluble organic solvent having a boiling point of less than 100° C. or more than 260° C. From the viewpoint of improving the highlight suitability and the drying property, the content of the water-soluble organic solvent having a boiling point of less than 100° C. or more than 260° C. is preferably 5 mass % or less, more preferably 3 mass % or less, still more preferably 1 mass % or less.

[Surfactant]

The surfactant to be used in the present invention is preferably selected from an anionic surfactant, a nonionic surfactant, and an amphoteric surfactant, and those surfactants may be used in combination thereof.

Of those, from the viewpoint of improving the storability of the dispersion liquid, a nonionic surfactant is particularly preferred. Examples of the nonionic surfactant include alcohol-based, acetylene glycol-based, silicone-based, and fluorine-based surfactants, and those nonionic surfactants may be used in combination thereof. From the viewpoint of wettability to a printing substrate, a silicone-based surfactant is particularly preferred.

From the viewpoint of the wettability to a printing substrate, the alcohol-based surfactant is preferably an alkylene oxide adduct of an alcohol having 6 or more and 30 or less carbon atoms.

From the same viewpoint as above, the number of carbon atoms of the alcohol is preferably 8 or more, more preferably 10 or more, still more preferably 12 or more, and is preferably 24 or less, more preferably 22 or less, still more preferably 20 or less.

From the same viewpoint as above, the alkylene oxide adduct is preferably an ethylene oxide adduct or an ethylene oxide and propylene oxide adduct, more preferably an ethylene oxide adduct.

As commercially available products of the alcohol-based surfactant, there are given, as an ethylene oxide adduct of lauryl alcohol, EMULGEN 108 (HLB: 12.1, average number of moles of EO added: 6), EMULGEN 109P (HLB: 13.6, average number of moles of EO added: 8), EMULGEN 120 (HLB: 15.3, average number of moles of EO added: 13), EMULGEN 147 (HLB: 16.3, average number of moles of EO added: 17), and EMULGEN 150 (HLB: 18.4, average number of moles of EO added: 44) manufactured by Kao Corporation. Besides, there are given, for example, EMULGEN 707 (ethylene oxide adduct of a secondary alcohol having 11 to 15 carbon atoms, HLB: 12.1, average number of moles of EO added: 6) and EMULGEN 220 (ethylene oxide adduct of a linear primary alcohol having 16 to 18 carbon atoms, HLB: 14.2, average number of moles of EO added: 13) manufactured by Kao Corporation.

From the viewpoint of the wettability to a printing substrate, examples of the acetylene glycol-based surfactant include one or more kinds of acetylene glycols selected from 2,4,7,9-tetramethyl-5-decyne-4,7-diol, 3,6-dimethyl-4-octyne-3,6-diol, and 2,5-dimethyl-3-hexyne-2,5-diol, and ethylene oxide adducts of these acetylene glycols.

As commercially available products thereof, there are given, for example: Surfynol 104 (2,4,7,9-tetramethyl-5-decyne-4,7-diol, average number of moles of EO added: 0, HLB: 3.0), Surfynol 104E (50% diluted product of 2,4,7,9-tetramethyl-5-decyne-4,7-diol with ethylene glycol), Surfynol 104PG-50 (50% diluted product of 2,4,7,9-tetramethyl-5-decyne-4,7-diol with propylene glycol), and Surfynol 420 (EO adduct of 2,4,7,9-tetramethyl-5-decyne-4,7-diol having an average number of moles of EO added of 1.3, HLB: 4.7) manufactured by Nissin Chemical Industry Co., Ltd. and Air Products & Chemicals, Inc.; and ACETYLENOL E13T (average number of moles of EO added: 1.3, HLB: 4.7) manufactured by Kawaken Fine Chemicals Co., Ltd.

Examples of the silicone-based surfactant include dimethylpolysiloxane, a polyether-modified silicone, an amino-modified silicone, a carboxy-modified silicone, methyl phenyl polysiloxane, a fatty acid-modified silicone, an alcohol-modified silicone, an aliphatic alcohol-modified silicone, an epoxy-modified silicone, a fluorine-modified silicone, a cyclic silicone, and an alkyl-modified silicone. Of those, a polyether-modified silicone is preferred from the viewpoint of the wettability to a printing substrate.

Examples of the polyether-modified silicone include PEG-3 dimethicone, PEG-9 dimethicone, PEG-9PEG-9 dimethicone, PEG-9 methyl ether dimethicone, PEG-10 dimethicone, PEG-11 methyl ether dimethicone, PEG/PPG-20/22 butyl ether dimethicone, PEG-32 methyl ether dimethicone, PEG-9 polydimethylsiloxyethyl dimethicone, and lauryl PEG-9 polydimethylsiloxyethyl dimethicone. Of those, PEG-11 methyl ether dimethicone is particularly preferred.

As commercially available products thereof, there are given, for example, Silicone KF-6011, KF-6012, KF-6013, KF-6015, KF-6016, KF-6017, KF-6028, KF-6038, and KF-6043 manufactured by Shin-Etsu Chemical Co., Ltd.

From the viewpoint of improving the wettability to a printing substrate, the content of the surfactant in the ink is preferably 0.01 mass % or more and 5.0 mass % or less, more preferably 0.1 mass % or more and 2.0 mass % or less, still more preferably 0.2 mass % or more and 1.0 mass % or less.

The ratio accounted for by the nonionic surfactant in the total amount of the surfactants is preferably from 1/10 to 10/10, more preferably from 5/10 to 10/10, still more preferably from 7/10 to 10/10, in terms of nonionic surfactant/surfactant total amount (mass ratio).

[Water]

From the viewpoints of the drying property and a VOC reduction, the content of the water in the ink is preferably 50 mass % or more and 70 mass % or less, more preferably 52 mass % or more and 68 mass % or less, still more preferably 55 mass % or more and 65 mass % or less. When the ink contains a component other than the pigment, the polymer, the water-soluble organic solvent, the surfactant, and the water, the other component may be contained to replace part of the content of the water.

[Optional Components of Aqueous Gravure Ink]

To the ink, various additives, such as a pH adjuster, a viscosity modifier, an antifoaming agent, a preservative, and a corrosion inhibitor, may be further added.

[Gravure Printing]

The aqueous gravure ink of the present invention can be suitably used for printing using a gravure plate. Gravure printing is a method involving: supplying an ink to the surface of a gravure cylinder having cells formed in its surface while rotating the gravure cylinder; scraping off the ink with a doctor blade fixed at a predetermined position to leave the ink only in the cells; bringing a continuously supplied printing medium into pressure contact with the gravure cylinder through the use of an impression drum having a surface formed of rubber to transfer only the ink in the cells of the gravure cylinder onto the printing substrate, to thereby print a pattern.

[Printing Substrate]

Examples of the printing substrate to be used for printing in the present invention include: papers, such as coated paper, art paper, synthetic paper, and processed paper; and resin films, such as a polyester film, a polyethylene film, a polypropylene film, a polystyrene film, a vinyl chloride film, and a nylon film. The printing medium is preferably a resin film from the viewpoint of an increase in printing density. Of those, the printing medium is preferably a polyester film or a polypropylene film from the viewpoint of post-processing suitability. From the viewpoint of improving gravure printing suitability, a resin film subjected to surface treatment by discharge processing, such as corona treatment or plasma treatment, may be used.

EXAMPLES

Now, the present invention is more specifically described by way of Examples and the like. In the following Examples and the like, physical properties were measured by the following methods. "Part(s)" and "%" mean "part(s) by mass" and "mass %" unless otherwise specified.

(1) Measurement of Weight-Average Molecular Weight of Polymer

With the use of a liquid obtained by dissolving, in N,N-dimethylformamide, phosphoric acid and lithium bromide at concentrations of 60 mmol/L and 50 mmol/L, respectively, as an eluent, the molecular weight of a water-insoluble polymer was measured by a gel permeation chromatography method [GPA apparatus manufactured by Tosoh Corporation (HLA-8120GPA), columns manufactured by Tosoh Corporation (two TSK-GEL, α-M columns), flow rate: 1 mL/min]. Monodispersed polystyrene having a known molecular weight was used as a reference material.

(2) Measurement of Average Particle Diameter of Particles

Measurement was performed using a laser particle analysis system (manufactured by Otsuka Electronics Co., Ltd., model number: ELS-8000, cumulant analysis). A dispersion liquid diluted with water so that the concentration of particles to be measured was about $5 \times 10^{-3}$ mass % was used. Measurement conditions were a temperature of 25° C., an angle between incident light and a detector of 90°, and a cumulative number of 100 times, and the refractive index (1.333) of water was input as the refractive index of a dispersion solvent.

(3) Measurement of Acid Value

In a potentiometric automatic titration apparatus (manufactured by Kyoto Electronics Manufacturing Co., Ltd., electric burette, model number: APB-610), a polymer is dissolved in a titration solvent obtained by mixing toluene and acetone (2+1) and the solution is titrated with a 0.1 N potassium hydroxide/ethanol solution by a potentiometric titration method. An inflection point on a titration curve is defined as an end point. An acid value was calculated from the titre of the potassium hydroxide solution required to reach the end point.

Production Example I (Production of Water-insoluble Polymer a Solution)

The monomer, solvent, polymerization initiator (2,2'-azobis(2,4-dimethylvaleronitrile) (manufactured by Wako Pure Chemical Industries, Ltd., product name: V-65), and polymerization chain transfer agent (2-mercaptoethanol) (manufactured by Kishida Chemical Co., Ltd.) of kinds shown in the "initially loaded monomer solution" column of Table 1 were placed in a reaction vessel with two dropping funnels 1 and 2, and were mixed, followed by nitrogen gas purging. Thus, an initially loaded monomer solution was obtained.

Next, the monomers, solvent, polymerization initiator, and polymerization chain transfer agent shown in the "monomer solution 1 to be dropped" column of Table 1 were mixed to provide a monomer solution 1 to be dropped, which was placed in the dropping funnel 1, followed by nitrogen gas purging. In addition, the monomers, solvent, polymerization initiator, and polymerization chain transfer agent shown in the "monomer solution 2 to be dropped" column of Table 1 were mixed to provide a monomer solution 2 to be dropped, which was placed in the dropping funnel 2, followed by nitrogen gas purging.

The macromonomer in Table 1 is a 50 mass % toluene solution of a product available from Toagosei Co., Ltd. under the product name "AS-6S", which has a number-average molecular weight of 6,000. NK Ester TM-40G is the product name of methoxypolyethylene glycol monomethacrylate manufactured by Shin-Nakamura Chemical Co., Ltd. (average number of moles of ethylene oxide added=4). BLEMMER PP1000 is the product name of polypropylene glycol monomethacrylate manufactured by NOF Corporation (average number of moles of propylene oxide added=5, terminal: hydrogen atom). The polymerization initiator V-65 is the product name of 2,2'-azobis(2,4-dimethylvaleronitrile) manufactured by Wako Pure Chemical Industries, Ltd. In addition, for methacrylic acid and styrene in Table 1, reagents manufactured by Wako Pure Chemical Industries, Ltd. were used.

Under a nitrogen atmosphere, the initially loaded monomer solution in the reaction vessel was kept at 77° C. while being stirred, and the monomer solution 1 to be dropped in the dropping funnel 1 was slowly dropped into the reaction vessel over 3 hours. Then, the monomer solution 2 to be dropped in the dropping funnel 2 was slowly dropped into the reaction vessel over 2 hours. After the completion of the dropping, the mixed solution in the reaction vessel was stirred at 77° C. for 0.5 hour.

Then, a polymerization initiator solution of 1 part of the above-mentioned polymerization initiator (V-65) dissolved in 100 parts of methyl ethyl ketone (manufactured by Wako Pure Chemical Industries, Ltd.) was prepared and added to the mixed solution, and the resultant was stirred at 77° C. for 0.5 hour to perform aging. The preparation and addition of the polymerization initiator solution, and aging described above were further performed five times. Then, the reaction solution in the reaction vessel was kept at 80° C. for 1 hour, and 429 parts of methyl ethyl ketone was added so as to achieve a solid content concentration of 38.0%. Thus, a water-insoluble polymer a solution was obtained. The water-insoluble polymer a had a weight-average molecular weight of 62,000 and an acid value of 102.

TABLE 1

| | Initially loaded monomer solution (part(s)) | Monomer solution 1 to be dropped (part(s)) | Monomer solution 2 to be dropped (part(s)) | Monomer loading ratio (%) |
|---|---|---|---|---|
| Styrene | 39.6 | 316.8 | 39.6 | 44 |
| Macromonomer AS-6S | 27.0 | 243.0 | 0.0 | 15 |
| Methacrylic acid | 0.0 | 115.2 | 28.8 | 16 |
| NK Ester TM-40G | 22.1 | 176.4 | 22.1 | 24.5 |
| BLEMMER PP-1000 | 0.5 | 3.6 | 0.5 | 0.5 |
| MEK | 15.8 | 173.3 | 126.0 | |
| Mercaptoethanol | 0.1 | 0.9 | 0.3 | |
| V-65 | 0.0 | 7.2 | 1.8 | |

In Table 1, the blending amount of each blended material is expressed in part(s) by mass. The monomer loading ratio in Table 1 is a value at a solid content of 50% in the case of the macromonomer, and is a value at a solid content of 100% for each of the other monomers. In addition, the loading amounts of the monomer solutions in Table 1 are values in solutions.

Production Example II (Production of Dispersion Liquid of Water-Insoluble Polymer b Particles)

0.5 g of methacrylic acid, 14.5 g of methyl methacrylate (manufactured by Wako Pure Chemical Industries, Ltd.), 5.0 g of 2-ethylhexyl acrylate (manufactured by Wako Pure Chemical Industries, Ltd.), LATEMUL E-118B (11.1 g of sodium polyoxyethylene alkyl ether sulfate, manufactured by Kao Corporation, surfactant), 0.2 g of potassium persulfate serving as a polymerization initiator (manufactured by Wako Pure Chemical Industries, Ltd.), and 282.8 g of ion-exchanged water were placed in a reaction vessel with a dropping funnel, and were mixed at 150 rpm, followed by nitrogen gas purging. Thus, an initially loaded monomer solution was obtained.

A monomer solution to be dropped obtained by mixing 9.5 g of methacrylic acid, 275.5 g of methyl methacrylate, 95.0 g of 2-ethylhexyl acrylate, 35.1 g of LATEMUL E-118B, 0.6 g of potassium persulfate, and 183.0 g of ion-exchanged water at 150 rpm was placed in the dropping funnel, and nitrogen gas purging was performed.

Under a nitrogen atmosphere, the initially loaded monomer solution in the reaction vessel was increased in temperature from room temperature to 80° C. over 30 minutes while being stirred at 150 rpm. While the temperature was kept at 80° C., the monomers in the dropping funnel were slowly dropped into the reaction vessel over 3 hours. After the completion of the dropping, while the temperature in the reaction vessel was kept, the contents were stirred for 1 hour, and 204.7 parts of ion-exchanged water was added. Then, the resultant was filtered through a stainless-steel wire mesh (200 mesh) to provide a dispersion liquid of water-insoluble polymer b particles (solid content concentration: 40%, average particle diameter: 100 nm, acid value: 16, Tg: 48° C.).

Production Example III (Production of Aqueous Dispersion A of Pigment-Containing Polymer Particles)

225.6 Parts of the water-insoluble polymer a solution (solid content concentration: 38.0%) obtained in Production Example I was mixed with 72.6 parts of methyl ethyl ketone (MEK) to provide a MEK solution of the water-insoluble polymer a. The MEK solution of the water-insoluble polymer a was put into a vessel having a disper blade and having a volume of 2 L. While the solution was stirred under the condition of 1,400 rpm, 681.9 parts of ion-exchanged water, 29.8 parts of a 5 N sodium hydroxide aqueous solution (manufactured by Wako Pure Chemical Industries, Ltd.), and 2.3 parts of a 25% ammonia aqueous solution (manufactured by Wako Pure Chemical Industries, Ltd.) were added, and the degree of neutralization with sodium hydroxide and the degree of neutralization with ammonia were adjusted to 78.8 mol % and 21.2 mol %, respectively. The resultant was stirred at 1,400 rpm for 15 minutes while being cooled in a water bath at 0° C.

Then, 200 parts of carbon black (manufactured by Cabot Japan K.K., product name: MONARCH 717) was added, and the mixture was stirred at 6,400 rpm for 1 hour. The resultant pigment mixture was subjected to 9-pass dispersion treatment at a pressure of 150 MPa using Microfluidizer "M-110EH" (manufactured by Microfluidics Corp.) to provide a dispersion treatment product (having a solid content concentration of 20%).

600 Parts of the dispersion treatment product obtained in the above-mentioned step was placed in a 2 L recovery flask, and 200 parts of ion-exchanged water was added (solid content concentration: 15.0%). The mixture was kept at a pressure of 0.09 MPa for 3 hours in a warm bath adjusted to 32° C. using a rotary evaporator (N-1000S, manufactured by Tokyo Rikakikai Co., Ltd.) at a number of rotations of 50 r/min, to thereby remove the organic solvent. Further, the resultant was concentrated to a solid content concentration of 25% by adjusting the warm bath to 62° C. and reducing the pressure to 0.07 MPa.

The resultant concentrate was put into a 500 ml angle rotor, and centrifuged at 7,000 rpm for 20 minutes using a high-speed refrigerated centrifuge (himaa AR22G, manufactured by Hitachi Koki Co., Ltd., preset temperature: 20° C.). After that, the liquid layer portion was filtered through a 5 μm membrane filter (manufactured by Sartorius, Minisart MAP-010XS).

To 400 parts of the filtrate obtained in the foregoing (pigment: 68.6 parts, water-insoluble polymer a: 29.4 parts), 2.1 parts of Denacol EX-321L (manufactured by Nagase ChemteX Corporation, trimethylolpropane polyglycidyl ether, epoxy equivalent: 129) (corresponding to 25 mol % with respect to a carboxylic acid serving as a cross-linking reaction point contained in methacrylic acid in the polymer) and 0.91 part of PROXEL LV(S) (manufactured by Lonza Japan Ltd, antifungal agent, active component: 20%) were added, and 51.94 parts of ion-exchanged water was further added so as to achieve a solid content concentration of 22.0%. The resultant was stirred at 70° C. for 3 hours, and then filtered through a 5 μm membrane filter (manufactured by Sartorius, Minisart MAP-010XS) to provide an aqueous dispersion A containing 22% of pigment-containing polymer particles (pigment aqueous dispersion; average particle diameter: 105 nm).

Production Example IV (Production of Aqueous Dispersion B of Pigment-Containing Polymer Particles)

An aqueous dispersion B of pigment-containing polymer particles (pigment aqueous dispersion; average particle diameter: 100 nm) was obtained in accordance with the production method described in Production Example III except that the carbon black was replaced with a copper phthalocyanine pigment (Pigment Blue 15:3, manufactured by DIC Corporation, product name: FASTGEN BLUE TGR-SD).

Production Example V (Production of Aqueous Dispersion C of Pigment-Containing Polymer Particles)

An aqueous dispersion C of pigment-containing polymer particles (pigment aqueous dispersion; average particle diameter: 160 nm) was obtained in accordance with the production method described in Production Example III except that the carbon black was replaced with an azo pigment (Pigment Red 150, manufactured by Fuji Pigment Co., Ltd., product name: Fuji Fast Carmine 522-1D).

Production Example VI (Production of Aqueous Dispersion D of Pigment-Containing Polymer Particles)

An aqueous dispersion D of pigment-containing polymer particles (pigment aqueous dispersion; average particle diameter: 120 nm) was obtained in accordance with the production method described in Production Example III except that the carbon black was replaced with an azo pigment (Pigment Yellow 74, manufactured by Sanyo Color Works, Ltd., product name: Fast Yellow 7414).

Production Example VII (Production of Aqueous Dispersion E of Pigment-Dispersed Polymer Particles)

85.7 Parts of a water-soluble polymer [manufactured by BASF Japan Ltd., product name: Joncryl 690 (acid value:

240, weight-average molecular weight: 16,500, Tg: 102° C.)] was 100% neutralized by adding 117.3 parts of ion-exchanged water and 22.5 parts of a 25% ammonia aqueous solution thereto. Thus, a water-soluble polymer c solution was obtained.

An aqueous dispersion E of pigment-dispersed polymer particles (pigment aqueous dispersion; average particle diameter: 132 nm) was obtained by the same procedure as that in Production Example III except that the water-insoluble polymer a solution was replaced with the water-soluble polymer c solution and the neutralization with the sodium hydroxide aqueous solution and the ammonia aqueous solution was not performed.

<Preparation of Aqueous Gravure Ink>

Production Example 1 (Production of Ink 1)

In order to achieve an ink composition shown in Table 2, in a production container, to 79.3 parts of the aqueous dispersion A described in Production Example III (corresponding to a pigment concentration in ink of 12%, solid content concentration: 22%), 0.7 part of a neutralizer (manufactured by Wako Pure Chemical Industries, Ltd., 1 N sodium hydroxide solution) and 5 parts of the aqueous dispersion liquid b described in Production Example II (corresponding to a polymer concentration in ink of 2%, solid content concentration: 40%) were added, and the mixture was stirred at 150 rpm. Further, 11 parts of diethylene glycol monoisobutyl ether, 0.5 part of a surfactant (manufactured by Shin-Etsu Chemical Co., Ltd., product name: KF-6011, PEG-11 methyl ether dimethicone), and 3.5 parts of ion-exchanged water were added, and the mixture was stirred under room temperature for 30 minutes and then filtered through a stainless-steel wire mesh (200 mesh) to provide an ink 1.

TABLE 2

|  | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Ink number | | 1 | 2 | 3 | 4 | 5 | 6 | 7 | 8 | 9 | 10 |
| Black pigment | | 12 | 10 | 6 | 10 | 10 | 10 | 10 | 10 | 10 | 10 |
| Cyan pigment | | | | | | | | | | | |
| Magenta pigment | | | | | | | | | | | |
| Yellow pigment | | | | | | | | | | | |
| Water-Insoluble polymer a | | 5.5 | 4.5 | 2.7 | 4.5 | 4.5 | 4.5 | 4.5 | 4.5 | 4.5 | 4.5 |
| Water-Insoluble polymer b | | 2.0 | 3.3 | 3.8 | 3.3 | 3.3 | 3.3 | 3.3 | 3.3 | 3.3 | 3.3 |
| Water-soluble polymer c | | | | | | | | | | | |
| PG | | | 5 | 5 | | | | | | | |
| MG | | | | | 20 | | | | | | |
| iPG | | | | | | 20 | | | | | |
| BG | | | | | | | 20 | | | | |
| MDG | | | | | | | | 20 | | | |
| iPDG | | | | | | | | | 20 | | |
| iBDG | | 11 | 8 | 12 | | | | | | 20 | |
| BDG | | | | | | | | | | | 20 |
| Other organic solvent | IPA | | | | | | | | | | |
| Other organic solvent | BTG | | | | | | | | | | |
| Surfactant | | 0.5 | 0.5 | 0.5 | 0.5 | 0.5 | 0.5 | 0.5 | 0.5 | 0.5 | 0.5 |
| Neutralizer | | 0.02 | 0.02 | 0.02 | 0.02 | 0.02 | 0.02 | 0.02 | 0.02 | 0.02 | 0.02 |
| Ion-exchanged water | | 68.98 | 68.68 | 69.98 | 61.68 | 61.68 | 61.68 | 61.68 | 61.68 | 61.68 | 61.68 |
| Halftone dot area ratio | | B | B | B | B | B | B | A | A | A | A |
| Drying property | | ○ | ○ | ○ | ○ | ○ | ○ | ○ | ○ | ○ | ○ |

|  | | Example 11 | Example 12 | Example 13 | Example 14 | Comparative Example 1 | Comparative Example 2 | Comparative Example 3 | Comparative Example 4 |
|---|---|---|---|---|---|---|---|---|---|
| Ink number | | 11 | 12 | 13 | 14 | 15 | 16 | 17 | 18 |
| Black pigment | | | | | 12 | 10 | 10 | 6 | 10 |
| Cyan pigment | | 10 | | | | | | | |
| Magenta pigment | | | 10 | | | | | | |

TABLE 2-continued

| | | | | | | | | | |
|---|---|---|---|---|---|---|---|---|---|
| Yellow pigment | | | | 10 | | | | | |
| Water-Insoluble polymer a | | 4.5 | 4.5 | 4.5 | | 4.5 | 4.5 | 2.7 | 4.5 |
| Water-Insoluble polymer b | | 3.3 | 3.3 | 3.3 | 2.0 | 3.3 | 3.3 | 3.3 | 3.3 |
| Water-soluble polymer c | | | | | 5.5 | | | | |
| | PG | | | | | | 3 | | |
| | MG | | | | | | | | |
| | iPG | | | | | | | | |
| | BG | | | | | | | | |
| | MDG | | | | | | | | |
| | iPDG | | | | | | | | |
| | iBDG | 20 | 20 | 20 | 11 | | 5 | 40 | |
| | BDG | | | | | | | | |
| Other organic solvent | IPA | | | | | 20 | | | |
| Other organic solvent | BTG | | | | | | | | 40 |
| | Surfactant | 0.5 | 0.5 | 0.5 | 0.5 | 0.5 | 0.5 | 0.5 | 0.5 |
| | Neutralizer | 0.02 | 0.02 | 0.02 | 0.02 | 0.02 | 0.02 | 0.02 | 0.02 |
| | Ion-exchanged water | 61.68 | 61.68 | 61.68 | 68.98 | 61.68 | 73.68 | 47.48 | 41.68 |
| | Halftone dot area ratio | A | A | A | B | C | C | A | A |
| | Drying property | ○ | ○ | ○ | ○ | ○ | ○ | x | x |

In Table 2, the blending amount of each blended material is expressed in part(s) by mass. Symbols in Table 2 represent the following.

IPA: isopropyl alcohol (manufactured by Wako Pure Chemical Industries, Ltd., boiling point: 88° C.)

PG: propylene glycol (manufactured by Wako Pure Chemical Industries, Ltd., boiling point: 188° C.)

MG: ethylene glycol monomethyl ether (manufactured by Wako Pure Chemical Industries, Ltd., boiling point: 125° C.)

iPG: ethylene glycol monoisopropyl ether (manufactured by Wako Pure Chemical Industries, Ltd., boiling point: 142° C.)

BG: ethylene glycol monobutyl ether (manufactured by Wako Pure Chemical Industries, Ltd., boiling point: 171° C.)

MDG: diethylene glycol monomethyl ether (manufactured by Wako Pure Chemical Industries, Ltd., boiling point: 194° C.)

iPDG: diethylene glycol monoisopropyl ether (manufactured by Wako Pure Chemical Industries, Ltd., boiling point: 207° C.)

iBDG: diethylene glycol monoisobutyl ether (manufactured by Wako Pure Chemical Industries, Ltd., boiling point: 220° C.)

BDG: diethylene glycol monobutyl ether (manufactured by Wako Pure Chemical Industries, Ltd., boiling point: 231° C.)

BTG: triethylene glycol monobutyl ether (manufactured by Wako Pure Chemical Industries, Ltd., boiling point: 271° C.)

Production Example 2 (Production of Ink 2)

An ink 2 was obtained in accordance with the production method described in Production Example 1 except that changes were made so as to achieve an ink composition shown in Table 2.

Production Example 3 (Production of Ink 3)

An ink 3 was obtained in accordance with the production method described in Production Example 1 except that changes were made so as to achieve an ink composition shown in Table 2.

Production Example 4 (Production of Ink 4)

An ink 4 was obtained in accordance with the production method described in Production Example 1 except that changes were made so as to achieve an ink composition shown in Table 2.

Production Example 5 (Production of Ink 5)

An ink 5 was obtained in accordance with the production method described in Production Example 1 except that changes were made so as to achieve an ink composition shown in Table 2.

Production Example 6 (Production of Ink 6)

An ink 6 was obtained in accordance with the production method described in Production Example 1 except that changes were made so as to achieve an ink composition shown in Table 2.

Production Example 7 (Production of Ink 7)

An ink 7 was obtained in accordance with the production method described in Production Example 1 except that changes were made so as to achieve an ink composition shown in Table 2.

Production Example 8 (Production of Ink 8)

An ink 8 was obtained in accordance with the production method described in Production Example 1 except that changes were made so as to achieve an ink composition shown in Table 2.

Production Example 9 (Production of Ink 9)

An ink 9 was obtained in accordance with the production method described in Production Example 1 except that changes were made so as to achieve an ink composition shown in Table 2.

Production Example 10 (Production of Ink 10)

An ink 10 was obtained in accordance with the production method described in Production Example 1 except that changes were made so as to achieve an ink composition shown in Table 2.

Production Example 11 (Production of Ink 11)

An ink 11 was obtained in accordance with the production method described in Production Example 1 except that the aqueous dispersion A described in Production Example III was replaced with the aqueous dispersion B described in Production Example IV and changes were made so as to achieve an ink composition shown in Table 2.

Production Example 12 (Production of Ink 12)

An ink 12 was obtained in accordance with the production method described in Production Example 1 except that the aqueous dispersion A described in Production Example III was replaced with the aqueous dispersion C described in Production Example V and changes were made so as to achieve an ink composition shown in Table 2.

Production Example 13 (Production of Ink 13)

An ink 13 was obtained in accordance with the production method described in Production Example 1 except that the aqueous dispersion A described in Production Example III was replaced with the aqueous dispersion D described in Production Example VI and changes were made so as to achieve an ink composition shown in Table 2.

Production Example 14 (Production of Ink 14)

An ink 14 was obtained in accordance with the production method described in Production Example 1 except that the aqueous dispersion A described in Production Example III was replaced with the aqueous dispersion E described in Production Example VII and changes were made so as to achieve an ink composition shown in Table 2.

Production Example 15 (Production of Ink 15)

An ink 15 was obtained in accordance with the production method described in Production Example 1 except that changes were made so as to achieve an ink composition shown in Table 2.

Production Example 16 (Production of Ink 16)

An ink 16 was obtained in accordance with the production method described in Production Example 1 except that changes were made so as to achieve an ink composition shown in Table 2.

Production Example 17 (Production of Ink 17)

An ink 17 was obtained in accordance with the production method described in Production Example 1 except that changes were made so as to achieve an ink composition shown in Table 2.

Production Example 18 (Production of Ink 18)

An ink 18 was obtained in accordance with the production method described in Production Example 1 except that changes were made so as to achieve an ink composition shown in Table 2.

Examples 1 to 14 and Comparative Examples 1 to 4

<Printing Test>

With the use of each of the inks of Production Examples 1 to 14 (Examples 1 to 14: inks 1 to 14) and the inks of Production Examples 15 to 18 (Comparative Examples 1 to 4: inks 15 to 18), printing was performed on the corona-treated surface of an OPP film (manufactured by Futamura Chemical Co., Ltd., FOR-AQ #20, Laminate grade). In the printing, a halftone dot pattern was printed with a gravure printing machine (eight-color press manufactured by Orient Sogyo Co., Ltd., OSG-SDX Type VLS) having mounted thereon a gravure roll (manufactured by Think Laboratory Co., Ltd., laser plate making system, gravure 250 lines, gravure cell depth: 5 µm) under printing conditions (printing speed: 30 m/min, drying temperature: 60° C.).

<Evaluation Method for Highlight Suitability>

The halftone dot area ratio of a 5% halftone dot printed portion was measured using a spectrophotometer (manufactured by GretagMacbeth, product name: SpectroEye) in a measurement mode (DIN, Abs), and highlight suitability was evaluated by the following criteria. When the evaluation is A or B, there is no problem in practical use. The results are shown in Table 2.

A: Halftone dot area ratio of 20% or more and less than 30%
B: Halftone dot area ratio of 10% or more and less than 20%
C: Halftone dot area ratio of 0% or more and less than 10%

<Evaluation Method for Drying Test>

The inks of Production Examples 1 to 14 (Examples 1 to 14: inks 1 to 14) and the inks of Production Examples 15 to 18 (Comparative Examples 1 to 4: inks 15 to 18) were each used and applied to the corona-treated surface of the OPP film with a wire bar (manufactured by Dai-ichi Rika Co., Ltd., No. 2), followed by drying in a dryer set to 60° C. (manufactured by Yamato Scientific Co., Ltd., Drying Oven DVS402) for 1 minute. After that, the printing surface was rubbed with a finger and a drying property was evaluated as to whether transfer of the ink to the finger did not occur by the following criteria. When the evaluation is ○, there is no problem in practical use. The results are shown in Table 2.
○: No ink transfer occurred
x: Ink transfer occurred As apparent from Table 2, the inks of Examples 1 to 14, in each of which the content of the water-soluble organic solvent having a boiling point of 100° C. or more and 260° C. or less is 10 mass % or more and 35 mass % or less, and the content of the water is 50 mass % or more and 70 mass % or less, each serve as an ink having a high 5% halftone dot area ratio, i.e., being excellent in highlight suitability, and being also excellent in drying property.

Meanwhile, in Comparative Example 1, in which the boiling point of the water-soluble organic solvent is less than 100° C., the drying property is excellent, but the 5% halftone dot area ratio is low, i.e., the highlight suitability is poor. In Comparative Example 2, in which the content of the water-soluble organic solvent is less than 10 mass %, the drying property is excellent, but the 5% halftone dot area ratio is low, i.e., the highlight suitability is poor. In Comparative Example 3, in which the content of the water-soluble organic solvent is more than 35 mass %, the 5% halftone dot area ratio is high, i.e., the highlight suitability is excellent, but the drying property is poor. In Comparative Example 4, in which the boiling point of the water-soluble organic solvent is more than 260° C., the 5% halftone dot area ratio is high, i.e., the highlight suitability is excellent, but the drying property is poor.

The invention claimed is:

1. An aqueous gravure ink, comprising:
   a pigment;
   a polymer;
   a water-soluble organic solvent;
   a surfactant; and
   water, wherein the water-soluble organic solvent comprises a glycol ether having a boiling point equal to or greater than 160° C. and less than or equal to 240° C., wherein a content of the water-soluble organic solvent in the aqueous gravure ink is equal to or greater than 13 mass % and less than or equal to 30 mass %, wherein a content of the water in the aqueous gravure ink is equal to or greater than 50 mass % and less than or equal to 70 mass %, wherein a molecular weight of the glycol ether is greater than or equal to 70 and equal to or less than 200, wherein the glycol ether is selected from the group consisting of ethylene glycol monomethyl ether, ethylene glycol monoisopropyl ether, ethylene glycol monoisobutyl ether, diethylene glycol monomethyl ether, diethylene glycol monoisopropyl ether, diethylene glycol monisobutyl ether, propylene glycol monomethyl ether, propylene glycol monopropyl ether, tripropylene glycol monomethyl ether, diethylene glycol dimethyl ether, diethylene glycol methyl ethyl ether, diethylene glycol diethyl ether, and triethylene glycol dimethyl ether,
   wherein the polymer in the aqueous gravure ink comprises water-insoluble polymers that comprise a polymer containing the pigment and a polymer free of pigment, wherein the surfactant is a nonionic silicone-based surfactant in an amount of equal to or greater than 0.01 mass percent to less than or equal to 5.0 mass percent, an acid value of the polymer containing the pigment is 50 or more and 140 or less, and a weight-average molecular weight of the polymer containing the pigment is 50,000 or more and 200,000 or less.

2. The aqueous gravure ink according to claim 1, wherein the water-insoluble polymers are equal to or greater than one percent mass percent and less than or equal to thirty mass percent of the aqueous gravure ink.

3. The aqueous gravure ink according to claim 1, wherein a weight-average molecular weight of the polymer free of the pigment is at least 100,000 and 2,500,000 or less.

4. The aqueous gravure ink according to claim 1, wherein a content of the polymer containing the pigment in the aqueous gravure ink is equal to or greater than one mass percentage and less than thirty mass percentage.

5. The aqueous gravure ink according to claim 1, wherein an average particle diameter of the polymer containing the pigment is equal to or greater than 30 nm and equal to or less than 200 nm.

6. The aqueous gravure ink according to claim 1, wherein the content of the surfactant in the ink is 0.2 mass % or more and 1.0 mass % or less.

7. The aqueous gravure ink according to claim 1, wherein the polymer containing the pigment comprises a vinyl-based polymer obtained by copolymerizing a monomer mixture containing an ionic monomer and a hydrophobic monomer, and a mass ratio of the ionic monomer to the hydrophobic monomer is from 0.01 to 1.

8. The aqueous gravure ink according to claim 1, wherein the polymer containing the pigment comprises a vinyl-based polymer, the polymer free of the pigment being produced via an emulsion polymerization method.

* * * * *